US006996166B2

(12) United States Patent
Roos et al.

(10) Patent No.: US 6,996,166 B2
(45) Date of Patent: *Feb. 7, 2006

(54) APPARATUS AND METHOD FOR PROVISION OF A BROADBAND ACCESS IN A TELECOMMUNICATION SYSTEM

(75) Inventors: Sture Roos, Bergshamra (SE); Lars-Olof Haster, Huddinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 748 days.

This patent is subject to a terminal disclaimer.

(21) Appl. No.: 09/732,879

(22) Filed: Dec. 11, 2000

(65) Prior Publication Data

US 2002/0054628 A1    May 9, 2002

(30) Foreign Application Priority Data

Nov. 3, 2000    (SE) ..................................... 0004037

(51) Int. Cl.
   *H04B 1/38* (2006.01)
(52) U.S. Cl. ...................... 375/222; 370/401; 370/261; 379/202
(58) Field of Classification Search ................ 375/222; 370/261, 352, 60.1, 401; 379/93.14, 59, 379/211, 98, 202; 455/403
   See application file for complete search history.

(56) References Cited

U.S. PATENT DOCUMENTS

| 4,245,342 | A |   | 1/1981 | Entenman |
| 5,428,608 | A | * | 6/1995 | Freeman et al. ............ 370/261 |
| 5,475,735 | A | * | 12/1995 | Williams et al. ............ 455/403 |
| 5,883,941 | A |   | 3/1999 | Akers |
| 5,970,088 | A |   | 10/1999 | Chen |
| 5,982,768 | A |   | 11/1999 | Bellenger et al. |
| 6,014,431 | A |   | 1/2000 | McHale et al. |
| 6,141,356 | A |   | 10/2000 | Gorman |
| 6,169,788 | B1 | * | 1/2001 | McHale et al. .......... 379/93.14 |
| 6,385,203 | B2 | * | 5/2002 | McHale et al. ............. 370/401 |

FOREIGN PATENT DOCUMENTS

| EP | 0 690 597 A1 | 1/1996 |
| EP | 0 893 934 A1 | 1/1999 |
| SE | 511 812 C2 | 11/1999 |
| WO | 97/37458 A2 | 10/1997 |
| WO | WO 99/18712 | * 5/1998 |

OTHER PUBLICATIONS

U.S. Appl. No. 09/732,878, filed Dec. 11, 2000 entitled "Apparatus and Method for Pre-Provisioning of Broadband Access to Subscribers in a Telecommunication System".
U.S. Appl. No. 09/741,741, filed Dec. 21, 2000 entitled "Apparatus and Method for Provision of a Back-Up Connection in a Telecommunication System".

(Continued)

Primary Examiner—Shuwang Liu
Assistant Examiner—Eva Zheng
(74) Attorney, Agent, or Firm—Nixon & Vanderhye P.C.

(57) ABSTRACT

An apparatus in a telecommunication system provides access to telecommunication services to subscribers at user terminals. Each terminal is separately connected to at least one access point via a xDSL modem and a communication network. The access point includes one or more xDSL modems with filters. As a result, a large number of subscribers can be connected in a short period of time, and the subscribers can consider the establishment of the connection as plug-and-play.

15 Claims, 3 Drawing Sheets

OTHER PUBLICATIONS

European Communication dated Feb. 21, 2003 in corresponding EP application No. 00850201.5-1525.
Goralski, "ADSL and DSL Technologies", ADSL and DSL Technologies, New York, McGraw-Hill, US, 1998, pp. 174-179, 219, 223-224, 252-253, 256-258, 262, 265 and 268.
EP Search Report mailed Jul. 2, 2001 in corresponding EP application 00850201.5-2216.
International Search Report mailed Jan. 30, 2002 in corresponding PCT application PCT/SE01/02403.

* cited by examiner

APPARATUS AND METHOD FOR PROVISION OF A BROADBAND ACCESS IN A TELECOMMUNICATION SYSTEM

TECHNICAL FIELD

The present invention relates to an apparatus and a method in a telecommunication system for providing access to telecommunication services to subscribers at user terminals, each of which being separately connected to at least one access point via high speed modems and a communication network, the at least one access point comprising high speed modems with filters.

BACKGROUND

Internet and its related customer services has had an enormous break through during the last decade. Even though the early stages of what has become the Internet of today were almost unknown only ten years ago, at least among ordinary technically oriented people, the Internet of today is virtually known to everyone in the so-called industrialised world. Everyday, the number of people practising and using the Internet is increasing. Many people use it professionally, such as use in offices and laboratories, but also other kinds of use increases rapidly, such as daily use in people's residences.

Customer services developed that are mainly designed for and are well-adapted to new possibilities governed by the Internet have increased at correspondingly fast pace. As a consequence of the increasing possibilities provided by higher data transmission rates and the enhanced image quality and even on-line video over the Internet, to mention just two conceivable applications among many others, a great demand for higher transmission rates has grown among by potential customers, i.e. future subscribers, which has led to a new and currently developing market including significant business opportunities for several involved parties. The customers may for instance be multimedia interested people who want to be able to download real time video or transfer large amounts of data, such as very high resolution images, music files, etc, to and from computers in their homes. A market challenge it to be able to provide high transmission access to the Internet for every customer who is or might become interested.

In order to provide all of these customers with connections supporting very high transmission rates, preferably bi-directional transmission exceeding 2 Mbit per second, which is sometimes called broadband access according to one of a plurality of definitions, a technique allowing for non-problematic mass-installation is required. Prior art, like for instance the international patent application WO 99/51019, discloses an apparatus for communicating with a telephone company location, which apparatus has an integrated splitter combining DSL and ADSL signals. According to the disclosed invention, also a pair gain remote transceiver terminal is connected to the splitter.

However, prior art does not disclose a satisfactory solution to the problem of installing connections for a great number of subscribers wanting access to the Internet at high transmission rates, so-called broadband, in a short period of time and with minimised effort of technically qualified staff. Being able to use a minimum of staff is an absolute prerequisite not only for enabling commercial success when mass-connecting the subscribing customers but also for meeting the requirements of installation in a short period of time. Perhaps the most serious drawback associated with prior art is that manual connection involving trained technicians must be made by hand and thus will be a serious bottleneck when a great number of subscribers are about to get connected.

SUMMARY

One object of the present invention is to alleviate the previously mentioned problems associated with prior art technology. This object is achieved by means of an apparatus and a method in a telecommunication system for providing access to telecommunication services to subscribers at user terminals, each of which being separately connected to at least one access point via a net terminal including xDSL modems, and a communication network, wherein the at least one access point comprises xDSL modems with filters and the access point modems are arranged in a pool of a plurality of xDSL modems;

the required access point filters connected to the access point modems are arranged in a pool of a plurality of filters;

a control means is adapted to control modems and filters during establishment of a connection between the user terminals and the at least one access point whereby a connection for bi-directional broadband data transmission is created;

characterized in that the net terminal is provided with an in-band modem for transfer of information required for initial installation of the connection, the connection being monitored and controlled by he control means until established.

One advantage of the apparatus and method according to the invention is a plug-and-play possibility for the customer himself to access xDSL with high transmission rates. By means of the invention, the currently connected subscribing customer has immediate access to the Internet and is instantly able to use its customer services provided over a broadband access technology.

Another object is to solve the problem of monitoring the great number of connected and installed subscriber equipment. This problem is solved in that a management system is provided to process retrieved additional user information whereby the established connection can be adapted according to user specifications.

Yet another advantage of the present invention is that testing can be performed more efficiently in the telecommunication system either automatically or manually in a simplified way.

BRIEF DESCRIPTION OF THE DRAWINGS

The above and further features, advantages and benefits of the present invention will be apparent upon consideration of the following detailed description, taken in conjunction with the accompanying drawings, in which like reference characters and figures refer to like parts throughout, and in which.

DETAILED DESCRIPTION

Figure 1:
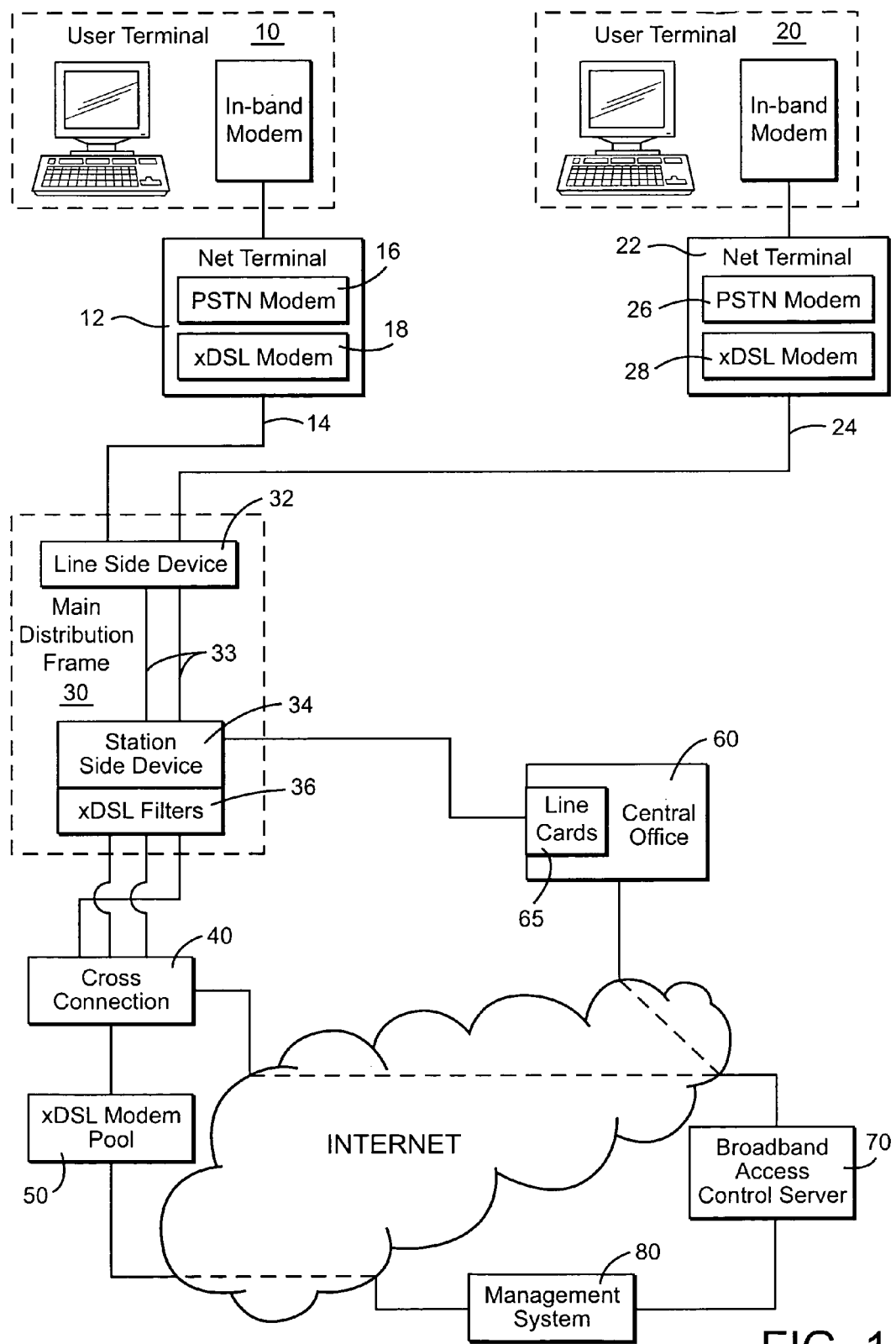
FIG. 1 illustrates a schematic view of one embodiment of the apparatus according to the present invention.

The following description is of the best mode presently contemplated for practising the invention. The description is not to be taken in a limiting sense, but is made merely for the purpose of describing the general principles of the invention. The scope of the invention should be ascertained with reference to the issued claims.

Copper wires, such as twisted wire pairs between a telephone exchange and different users of telecommunication services have more a lot more information capacity than the capacity currently used for voice services. Telephones and connected copper wires together with telephone exchanges form the usual telephone network, which is referred to as the PSTN (public stationary telephone network). The PSTN has been build-up during several decades and constitutes an already existing and widely distributed communication network. However, as mentioned above, it can be utilized more effectively than almost exclusively for transmission of voice traffic, which is the current situation. Today many users are connected to the Internet via PSTN by a modem connection, but the transmission rates are not very high and therefore constitute a limiting factor. Several base band and pass band transmission systems, collectively referred to as xDSL, have been developed over the past decade that enable up to several megabits per second, which is several orders of magnitude higher transmission than today's PSTN modem connections. This much higher transmission is also carried over telephone twisted pair loops within the PSTN, i.e. over the already in-place copper cables, which network in most cases is owned by telephony providing companies. The PSTN covers the access to the telecommunication system of for most of the potential high transmission subscribers all over the world. The twisted pair cables made from copper are used for the connection of different end users with a central office.

Due to the above mentioned principally commercial reasons, much of the efforts put down in development of new signal processing techniques has been directed to the objective to use these in-place copper cables. This because substituting them by data transmission lines with a higher bandwidth, like for instance optical glass fibres, would have taken longer time and would also be extremely costly, By means of organising signals, e.g. into ATM (asynchronous transfer mode) data, voice and video signals can be allowed to be carried in a common xDSL payload, which will be described in the following.

The term xDSL is a generic term for a number of similar forms of DSL (digital subscriber line) technologies. The "x" in xDSL is arbitrary and depends on the implemented technology. Two of the major types of used technologies are HDSL (high bit rate digital subscriber line) and ADSL (asynchronous digital subscriber line) but VDSL and SDSL are other similar common technologies included in the generic term xDSL. xDSL processed signals are designed to maximise the rate of transmission of digital signals through subcategories of non-loaded twisted pairs, making use of bandwidths that can be greater than 1 MHz.

FIG. 1 schematically illustrates a first embodiment of the apparatus improving the telecommunication system. In FIG. 1 two user terminals 10, 20 are illustrated, each of which is separately connected to a net terminal 12, 22, The net terminal 12, 22 operates as a gateway between the user terminal 10, 20 and the xDSL enhanced telephone network begins at the wall socket and continues outside of the building of the user terminals 10, 20 with copper cables and telephone exchanges. The net terminal 12, 22, including at least one PSTN modem 16, 26 and an xDSL modem 18, 28, provides the user terminal 10, 20 and its subscribing user with access to xDSL services. From the net terminal 12, 14 a copper pair cable 14, 24 leads to a main distribution frame 30, which is divided into two devices, i.e. the line side device 32 and the station side device 34. The two devices of the main distribution frame 30 are preferably integrated and connection between the line side device 32 and the station side device 34 is done by means of so-called jumpers 33. In prior art, these jumpers 33 usually must be manually re-connected in a plurality of combinations depending on in which manner customers of a provider of communication services, a so-called operator, are willing to subscribe to the operator's various customer services.

In order for an xDSL modem to function, a filter must be provided. According to the present invention, a filter arrangement 36 is arranged in the station side device 34 of the main distribution frame 30 containing one filter per expected or potential user terminal 10, 20 to connect to the PSTN via a provided xDSL customer service. Hereby no so-called re-jumpering, i.e. disconnection and then re-connection of a jumper, is required since each potential user in theory is provided with the xDSL service in advance, even though the service must not have been fully realised by final activation of the connection. One example is that the subscriber has not yet received his own net terminal 12, 22. Installation of a filter arrangement 36 is easy and does not require technically trained staff, since user tables or other more or less complicated registers of already connected jumpers and jumpers to be connected or disconnected to a particular connector is no longer necessary. In addition to that advantage, the time of installation can be significantly reduced.

The output of each filter in the filter arrangement 36 is connected to a separate modem in a modem pool 50 via a metallic cross connector 40. The modem pool 50 consists of a number of separate modems corresponding to the number of filters of the filter arrangement 36. An arrangement like the above mentioned solves the problem of keeping order among the connecting wires. More in detail, what is meant is the present need of separating a wire connecting a particular filter of the filter arrangement 36 to a particular modem of the modem pool 50. According to the invention, it is no longer crucial to keep the order when connecting the wires that may even be intersected without effecting the functionality and operation of the wire installation. These improvements in relation with prior art technology simplify the installation for staff of the communication service provider and further reduces the time needed for installation, which is beneficial for the operator as well as for the communication service provider.

The net terminal 12, 22 also includes an in-band modem, like for instance a standard V.90 modem. By means of this standard modem, an initial connection is established with a broadband access control server 70. The initial connection is established with the broadband access control server 70 via the station side 34 of the main distribution frame 30 and a central office 60. The central office 60 has an arrangement of line cards 65 including several state of the art access possibilities and transmission techniques, such as for instance PSTN and ISDN. The connection from the central office 60 to the broadband access control server 70 is via the Internet, whereby an communicative internet protocol is used, such as the well-known protocol TCP/IP. When the broadband access control server 70 has been connected, it transfers information required for initialising xDSL by means of the modem pool 50 to the metallic cross connection 40.

A further possibility is that the broadband access control server 70 also retrieves user information in the form of a plurality of user specific parameters, in order to get the net terminal 12, 14 and the specific modem of the xDSL modem pool 50 to operate in a way expected by the customer. In one embodiment, the broadband access control server 70 is supported by a management system 80 for providing the metallic cross connection 40 and the modem pool 50 with user specific instructions, whereby the functionality can be adapted to requirements of each specific user of the xDSL connected user terminal 10, 20. In case of applying a management system 80, it communicates with either of, or with both of the metallic cross connection 40 and the xDSL modem pool 50 via the Internet. However, in another embodiment according to the invention, the tasks of the management system 80 are performed by the broadband access control server 70.

Figure 2:
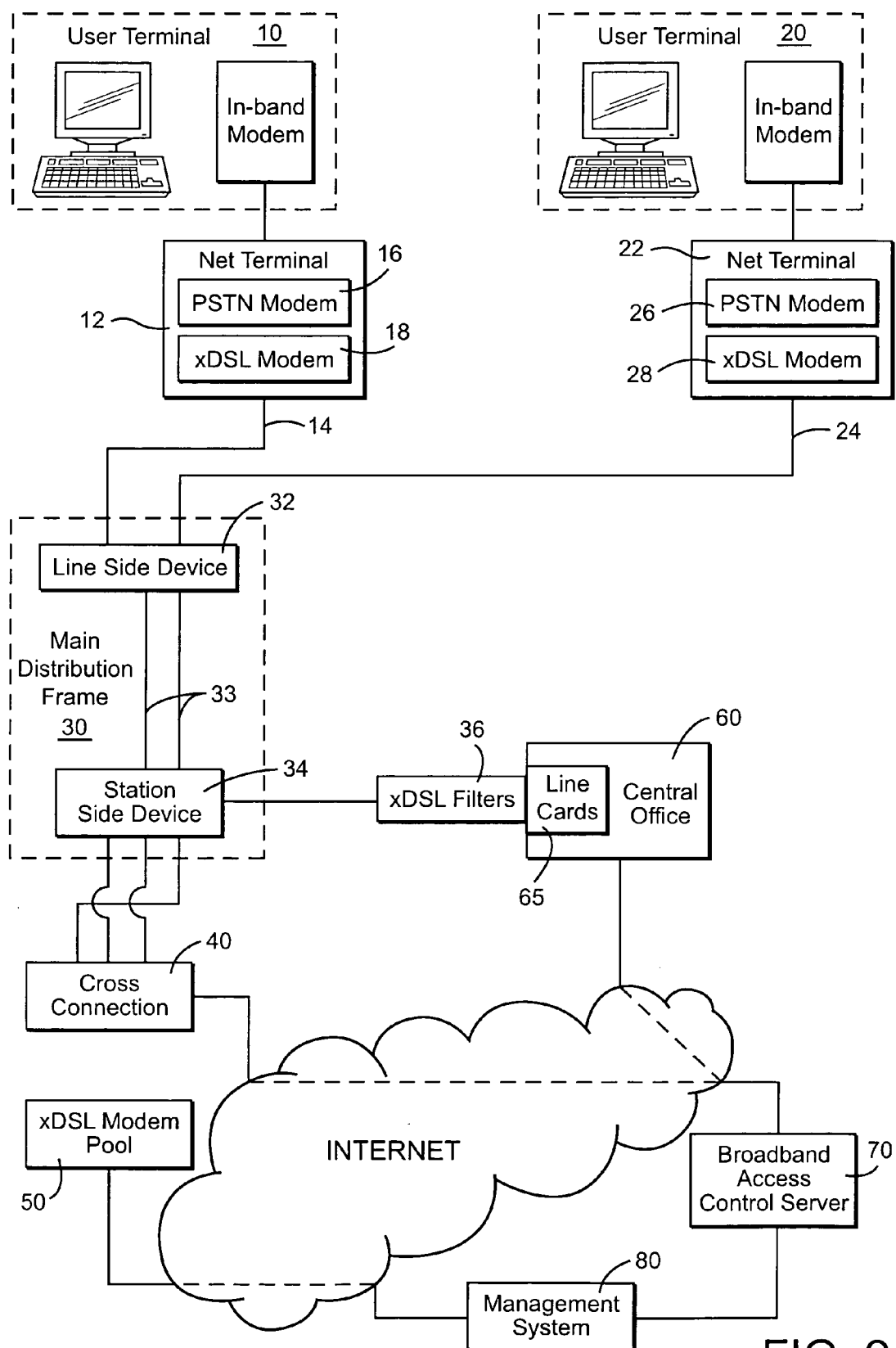
FIG. 2 illustrates a schematic view of another embodiment of the apparatus according to the present invention.

According to a second embodiment and with reference to FIG. 2, the filter arrangement 36 is connected directly in front of the connectors of the line cards 65 instead of in the main distribution frame 30. One advantage of an arrangement like that is the space saved in the main distribution frame 30. In many cases there is lack of space in the main distribution frame 30, whereas the central office 60 provides more space. Another advantage is that centralisation of filter arrangements 36 means less distributed locations, which is beneficial for service and maintenance reasons.

Figure 3:
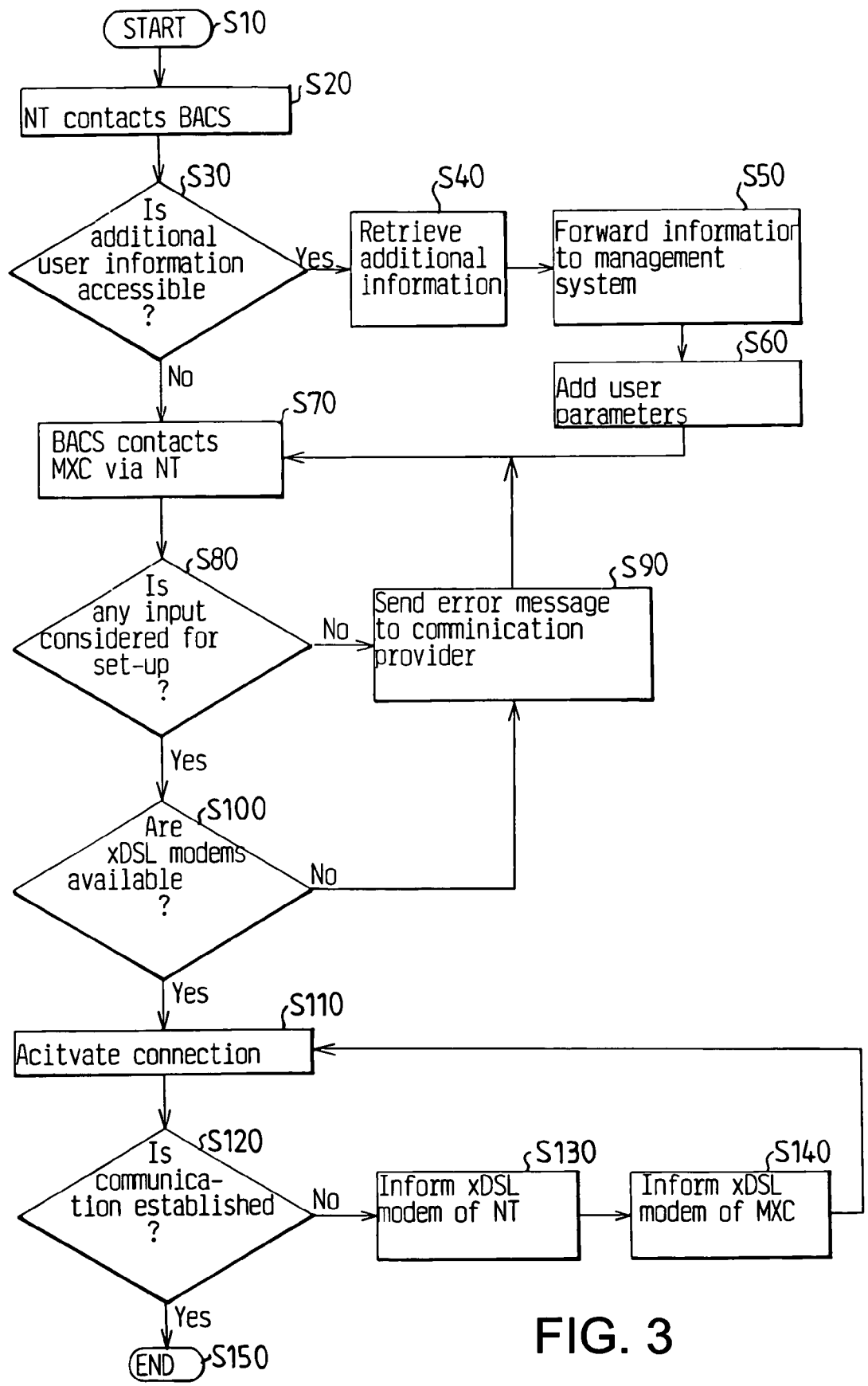
FIG. 3 is a flow chart illustrating the procedure of how a high speed transmission connection is established by means of the present invention.

Referring to FIG. 3, an operational sequence of the apparatus according to the present invention is described. The order of communication and the steps of actions taken are as follows: To start (S10) with, the net terminal 12, 22 via its standard PSTN modem 16 contacts (S20) the broadband access control server 70, which is responsible for establishing a connection between the xDSL modem 18, 28 of the net terminal 12, 22 and an available xDSL modem of the modem pool 50. A request for additional user parameters is sent (S30), and if such additional information exists it is retrieved (S40) by the broadband access control server 70. The parameters are forwarded (S50) to the management system 80 and subsequently, after having established a connection, the connection can be adapted (S60) by means of consideration to user parameters. If no additional user parameters are available, the sequence continues in that the broadband access control server 70 either instructs the net terminal 12, 22 to send (S70) a unique and identifiable signal, or sends the signal itself, to the metallic cross connection 40 in order to determine (S80) what inputs of the metallic cross connection 40 are unoccupied, and hence may be considered for establishment of a connection. In case no available inputs are found, an error message is sent (S90) to the operator of the communication system. When at least one unoccupied input has been found (S100), the metallic cross connection 40 chooses one of the inputs and establishes a connection. Furthermore, the metallic cross connection 40 determines (S100) whether there are xDSL modems available. If no modems are available, an error message is sent (S90) just like after another previous step in the sequence to the operator of the communication system. Connection is activated (S110) and monitored (S120) by the broadband access control server 70. However, if the activation fails, the broadband access control server is informed about the failure in establishing connection and takes action for informing (S130, S140) any of the net terminal's xDSL modems 18,28 and the modem pool's 40 xDSL modems in case it is needed. After having established such a high speed connection for transmission, the connection remains activated as long as the subscription is maintained by the customer and thus, the operative sequence is ended (S150).

By means of the invention, the currently connected subscribing customer has immediate access to the Internet and is able to use its customer services provided. The customer can regard the installation as being a so-called plug-and-play solution to access xDSL with accordingly high transmission rates. The operator does not have to be actively involved in the installation procedure, which is performed by the customer himself. However, the operator is of course able to monitor the installation and support the customer if help or support is needed.

What is claimed is:

1. A method in a telecommunication system for providing access to telecommunication services to subscribers at user terminals, each of which being separately connected to at least one access point, via a net terminal including xDSL modems, and a communication network, the at least one access point including xDSL modems with filters, comprising:
   transmitting a signal from an in-band modem of the net terminal including a user terminal identity to a controller;
   in response, the controller searching for an available connection path for the net terminal at an access point;
   creating, by the controller, a bi-directional broadband data transmission path between the user terminal and the at least one access point using the in-band modem connection of the net terminal for initial installation of the broadband data transmission path; and
   activating, by the controller, the transmission path between the user terminal and the at least one access point.

2. Apparatus for use in a telecommunication system for providing access to telecommunication services to subscribers, comprising:
   plural subscriber user terminals;
   plural net terminals, each user terminal being coupled to one of the net terminals, and each net terminal including an in-band modem and a first xDSL modem;
   a first access point coupled to plural ones of the net terminals and including a pool of second xDSL modems;
   a controller coupled to the access point and configured to control the first xDSL modem and the second xDSL modems to establish a bi-directional broadband connection between one of the user terminals and the access point,
   wherein prior to establishment of the bi-directional broadband connection, the in-band modem in the net terminal associated with the one user terminal is configured to establish a preliminary communication with the controller to engage the controller to initialize one of the second xDSL modems for the bi-directional broadband connection.

3. An apparatus in a telecommunication system according to claim 2, wherein the in-band modem and the first xDSL modem are configured to operate independently and in parallel in the net terminal.

4. An apparatus in a telecommunication system according to claim 2, where an input signal to one of the second xDSL modems is a signal output from one of a pool of xDSL filters.

5. An apparatus in a telecommunication system according to claims 2, wherein the pool of xDSL filters is located in the first access point.

6. An apparatus in a telecommunication system according to claims 2, wherein the pool of xDSL filters is located in a second access point coupled between the first access point and the controller.

7. An apparatus in a telecommunication system according to claim 2, further comprising:
a management system for processing retrieved user information so that the controller can adapt the established connection the retrieved user information.

8. An apparatus in a telecommunication system according to claim 2, wherein the controller is configured to retrieve subscriber information to individualize the established connection.

9. A method for use in a telecommunication system for providing access to telecommunication services to subscribers at user terminals, each user terminal being coupled to one of plural net terminals, and each net terminal including an in-band modem end a first xDSL modem, and each net terminal being coupled to a first access point that includes a pool of second xDSL modems, comprising:
detecting a need to establish a bi-directional broadband connection between one of the user terminals and the access point;
establishing an initial communication from the in-band modem of the net terminal associated with the one user terminal and a controller to initialize one of the second xDSL modems for the bi-directional broadband connection;
in response to the initial communication, the controller configuring the first xDSL modem and one of the second xDSL modems to establish the bi-directional broadband connection between the user terminal and the first access point.

10. The method in claim 9, wherein an input signal to the one second xDSL modem is a signal output from one of a pool of xDSL filters.

11. The method in claim 9, wherein establishing the initial communication further comprises:
transmitting a signal from the in-band modem that includes a user terminal identity.

12. The method in claim 9, wherein after establishing the initial communication, the controller searches for an available connection path for the net terminal through the access point.

13. The method in claim 9, further comprising:
activating the bi-directional broadband connection between the user terminal and the access point.

14. The method in claim 9, further comprising using the method in claim 9 to establish multiple bi-directional broadband connections with multiple user terminals.

15. The method in claim 9, further comprising using the method in claim 9 to establish simultaneously multiple bi-directional broadband connections with multiple user terminals.

* * * * *